US007110552B1

(12) United States Patent
Saliterman

(10) Patent No.: US 7,110,552 B1
(45) Date of Patent: Sep. 19, 2006

(54) PERSONAL LISTENING DEVICE FOR ARENA EVENTS

(75) Inventor: Mark Saliterman, Edina, MN (US)

(73) Assignee: Front Row Adv, St. Louis Park, MN (US)

( * ) Notice: Subject to any disclaimer, the term of this patent is extended or adjusted under 35 U.S.C. 154(b) by 40 days.

(21) Appl. No.: 09/716,314

(22) Filed: Nov. 20, 2000

(51) Int. Cl.
*H04B 3/00* (2006.01)
*H04B 5/00* (2006.01)
*H04B 1/38* (2006.01)
*H04R 27/00* (2006.01)
*H04R 3/00* (2006.01)

(52) U.S. Cl. ............................ 381/77; 381/79; 381/82; 455/90.2

(58) Field of Classification Search .................... 38/77, 38/79, 92; 455/180.1, 179.1, 188.1
See application file for complete search history.

(56) References Cited

U.S. PATENT DOCUMENTS 5,668,884 A * 9/1997 Clair et al. .................... 381/82
5,822,440 A * 10/1998 Oltman et al. ................ 381/82
6,064,860 A * 5/2000 Ogden ........................ 455/66.1
6,434,398 B1 * 8/2002 Inselberg .................... 455/517
6,728,518 B1 * 4/2004 Scrivens et al. ........... 455/90.2

OTHER PUBLICATIONS

Persoal PA Value Pack System, copyright 1998, Williams Sound Corp. (4 pages).*
Advertisement by *Williams Sound*, for "Pro Wide-band System, Model PPA 250", (2 pages) ©1996, Williams Sound Corp.

* cited by examiner

*Primary Examiner*—Laura A. Grier

(57) ABSTRACT

A method and apparatus for transmitting sound generated at an event to those in attendance at the event is shown. This is accomplished by a system that collects an acoustic audio signal generated at a first location within a fixed space. The system also conditions the audio signal without introducing audio signals generated from outside said first location. Finally, the system transmits the conditioned audio signal to a receiver worn by at least one of a plurality of individuals within the aforementioned fixed space. This is particularly useful in settings such as a football stadium, a basketball arena, a hockey arena, a baseball stadium, an auditorium, a performance area in a restaurant or cruise ship, a soccer arena, a boxing ring or wrestling ring, an automotive racing track, or any other space within which a performance takes place.

4 Claims, 7 Drawing Sheets

Event #1

Event #2

PERSONAL LISTENING DEVICE FOR ARENA EVENTS

TECHNICAL FIELD

The invention disclosed herein relates to sound distribution systems, and more particularly to a system and method for real-time distribution of sounds emanating from an event to those in attendance at the event.

BACKGROUND OF THE INVENTION

Sporting events have become a part of the American culture, oftentimes serving as a focal point around which friends and families gather. Fans hungrily devour sports information and discuss the latest game. To serve this ravenous interest, various enterprises have sprung up, including sports-oriented networks, websites and magazines. The goal of each of these services is to give each fan what he or she most desires: to be closer to the game.

Nowhere can a fan be closer to a game than by actually attending the game in a front-row seat. With a front-row seat, every nuance of the game can be seen and heard. Coaches and players can be overheard. Players can be heard shouting encouragements and discussing strategy. A front-row seat permits a fan to experience the game in a personal and dramatic way. Front-row seats are exciting. Unfortunately, front-row seats are not available to everyone.

Fans who attend sporting events, but are not lucky enough to possess front-row tickets find their experiences to be more remote. Small gestures by the players and coaches cannot be seen from a distance. The various sounds of the game go unheard. The shouts of players become inaudible. It is impossible to hear coaches and players discussing the game. Even the sound of a bone-crunching tackle cannot be heard. Quite simply, the game loses some of its drama.

To counteract the negative effects of distance, fans have employed many strategies. Many fans bring binoculars to aid them in seeing the visual nuances lost with distance. Other fans bring radios to permit them to hear a broadcast of the game. Radio broadcasts are not effective surrogates for a front-row seat, however. Radio broadcasts do not carry sounds collected from the field of play, nor do such broadcasts carry sounds collected from areas immediately surrounding the field of play (such as dugouts or team benches). Additionally, radio broadcasts are typically delayed so that they are not synchronized with the game as it actually occurs. An additional drawback of radio broadcasts is that they carry a narrative of the game, an often unwanted feature for a fan that is already able to discern the major developments of the game.

Some fans bring hand-held televisions to sporting events. Hand-held televisions also have drawbacks, though. They are small and require the fan to remove his attention from the field of play, instead turning it to the television. Additionally, the broadcast is delayed. Most importantly, when viewing a televised sporting event, the fan is receiving a produced version of the game, rather than a true-to-life front-row experience.

The inadequacies of radio and television broadcast are reflected in the attendance figures for professional sports. Many professional sports teams fail to sell-out a significant number of their games, leading to several undesirable results. Often, in response to low attendance figures, professional sports organizations are forced to lower ticket prices for seats that offer a less intimate game-time experience. Some leagues impose television blackouts with respect to games that fail to sell-out, thereby inducing further losses due to lost television revenue. Even if tickets are sold, non-attendance results in lost concession and souvenir sales. Low revenues—whether the low revenues stem from unsold tickets or from non-attendance—are also a major factor in the relocation of professional sports franchises. Relocation of professional sports franchises is troubling on two fronts. When a professional sports franchise relocates, the community that loses its franchise loses a source of community pride and entertainment. Additionally, professional sports leagues that permit its franchises to move often suffer from fan cynicism, with many fans choosing to turn away from the particular sport entirely, thus resulting in further lost revenue for the league as a whole.

To preserve fan interest in and attendance of sports events, there exists a need for a method or system for providing fans with an experience approximating the close, exciting, and personal feel of a front-row ticket.

SUMMARY OF THE INVENTION

The method and apparatus in accordance with the present invention solves the aforementioned problem and other problems by transmitting sound generated at an event to those in attendance at the event. This is accomplished by a system that collects an acoustic audio signal generated at a first location within a fixed space. In some emodiments, the system also conditions the audio signal without introducing audio signals generated from outside said first location. Finally, in some embodiments, the system transmits the conditioned audio signal to a receiver worn by at least one of a plurality of individuals within the aforementioned fixed space. This invention is particularly useful in settings such as a football stadium, a basketball arena, a hockey arena, a baseball stadium, an auditorium, a performance area in a restaurant or cruise ship, a soccer arena, a boxing ring or wrestling ring, an automotive racing track, or any other space within which a performance takes place.

In another embodiment of the invention, the system collects an audio signal generated at a first location within a fixed space. The system then transmits, under a first transmission protocol uniquely associated with a particular event and first location within the fixed space, the audio signal collected from the first location to a receiver worn by at least one of a plurality of individuals within the fixed space. Finally, the audio signal is received by a receiver that is configured to operate under the aforementioned first transmission protocol.

In yet another embodiment of the invention, the system collects an audio signal generated at a first location within a fixed space at a particular event. Next, the system transmits, under a particular transmission protocol uniquely associated with the particular event, the audio signal to a receiver worn by at least one of a plurality of individuals within the aforementioned fixed space and at a distance from the aforementioned first location such that said individual would not otherwise hear the audio signal generated at the first location. Finally, a fee is charged to individuals in attendance at an event within the aforementioned fixed space in exchange for the aforementioned earpiece.

In yet another embodiment of the invention, the system collects an audio signal generated at a first location within a fixed space at a particular event. Next, the system transmits, under a particular transmission protocol uniquely associated with the particular event, the audio signal to a receiver worn by at least one of a plurality of individuals within the aforementioned fixed space. Finally, revenue is derived from the distribution of the earpiece.

In yet another embodiment of the invention, a system for distribution of sound within a fixed space is comprised of one or more audio collection units for collecting one or more audio signals from one or more locations with a fixed space. Additionally, one or more signal conditioning units are coupled to the aforementioned one or more audio collection units for conditioning the aforementioned one or more audio signals without introducing an audio signal generated from outside the aforementioned one or more locations. Finally, one or more transmitters are configured and arranged to transmit the aforementioned one or more audio signals under one or more transmission protocols, such that each of the aforementioned one or more audio signals is transmitted under its own transmission protocol, with the transmission protocol under which each of the aforementioned one or more audio signals is transmitted being uniquely associated with a particular event.

DETAILED DESCRIPTION OF THE INVENTION

Figure 1:
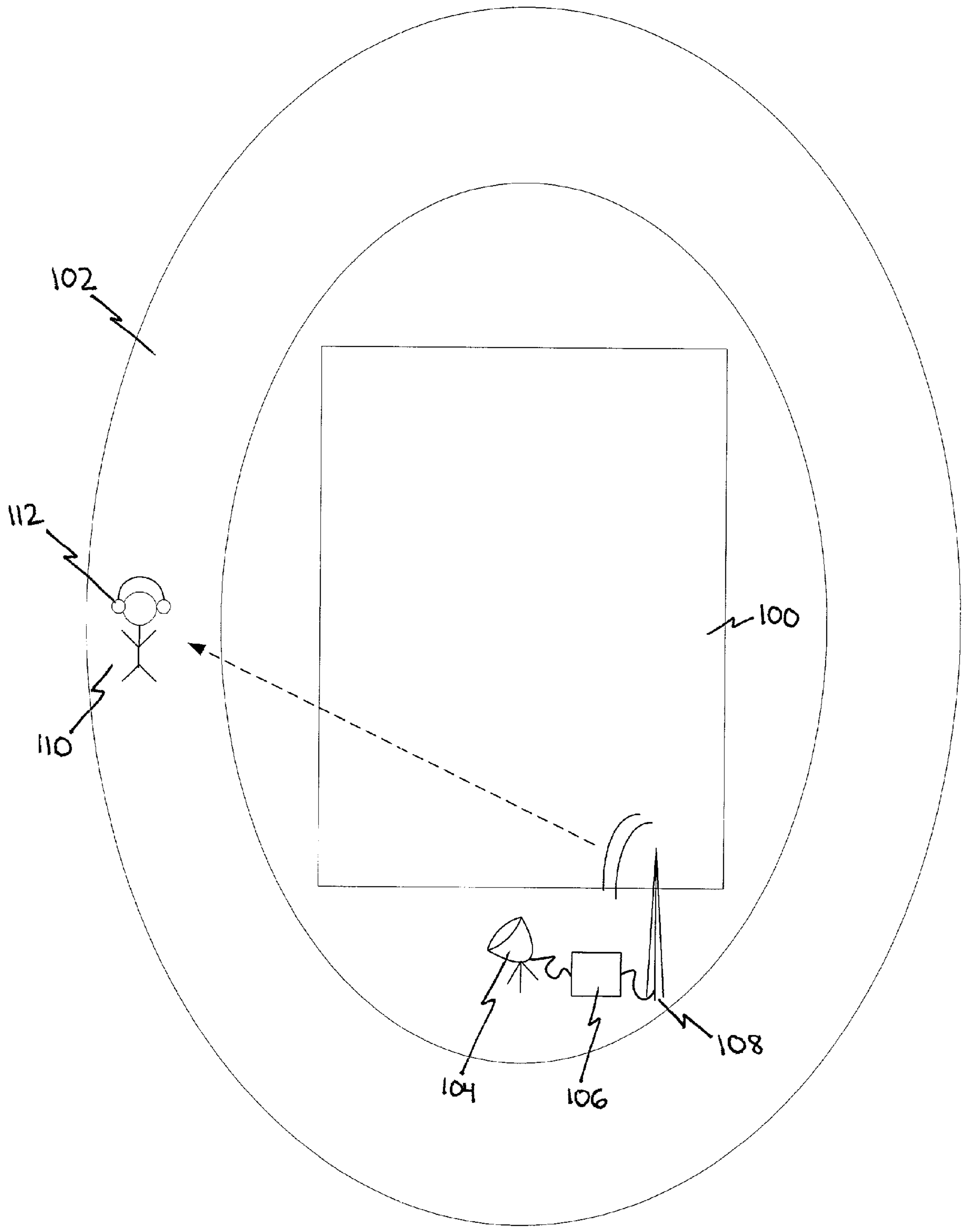
FIG. 1 depicts a system and method for collecting sound generated at one location within a defined space and transmitting it to another location within that defined space.

FIG. 1 illustrates the principle that sound that is generated at a point of interest within a fixed space can be collected and redistributed to members of an audience within that fixed space. Generally, the aforementioned fixed space is defined by the boundary of the audience in attendance at an event. For example, if the event in question is a football game, the point of interest at which sound is being collected might be the line of scrimmage, and the fixed space might be defined by the football stadium in which the audience is contained. FIG. 1 diagramatically represents a football arena as one example of an environment in which the system and method could operate. One skilled in the art would understand that the system described herein could operate in any fixed space. On the field 100 of play, sounds are generated by athletes engaged in the activity of playing football (for example, calling out audibles, engaging in banter, or making vicious tackles). Sounds are also generated up on areas immediately surrounding the field 100 such as players' benches and visiting and home sidelines. Fans are illustrated as sitting in stands 102. Some fans are seated in regions too remote from the field 100 of play to be able to hear the noises generated thereon or thereabout. Accordingly, the system and method collects the sounds from immediately on the field or thereabout the field and redistributes that sound to the fans in the bleachers 102. Some of the fans may be situated in such a fashion that they could not oridnarily hear some of the sounds being transmitted.

The system is generally comprised of an audio collection unit 104 (which receives an acoustic signal and transduces it into an eletrical signal), a signal conditioning unit 106 (which receives the transduced electrical signal from one or more audio collection units 104 and filters, mixes and/or switches the signal(s) to produce an appropriate signal for transmission), and a transmitter 108 (which transmits the signal provided by the signal conditioning unit 106). The audio collection unit 104 may be comprised of any form of microphone suitable for collecting noise from the field 100 of play and regions immediately thereabout. One example of such a microphone is a parabolic microphone, as is customarily used for collecting sound during sports broadcasts.

The signal conditioning unit 106 may include mixers for adjusting the level of multiple sources of audio signals, filters for filtering out frequency content not desirable in an audio signal, and switches for selecting amongst audio sources. Signal conditioning unit 106 serves as an interface between audio collection unit 104 and transmitter 108 and is therefore coupled either directly or indirectly on its input side to audio collection unit 104 and either indirectly or directly on its output side to transmitter 108.

Transmitter 108 receives the conditioned signal from signal conditioning unit 106, amplifies the signal, modulates the signal, and transmits the signal throughout the fixed space (in this case a football arena). A representative fan 110 is shown sitting in bleachers 102 wearing a receiver 112. Receiver 112 is configured and arranged to receive the signal transmitted by transmitter 108 and deliver an audio signal to fan 110. Fan 110 is thereby provided with an audio source simulating the effect of his having sat in a front-row seat or having been immediately on or about the field 100 of play. Transmitter 108 is shown in greater detail in FIGS. 4A–4C.

As stated earlier, FIG. 1 depicts a football arena for illustrative purposes only. The system and method described in FIG. 1 would be equally well suited to an enclosed space defined by a basketball arena, a hockey arena, a baseball stadium, an auditorium, a performance area in a restaurant or cruise ship, a soccer arena, a boxing ring or wrestling ring, an automotive racing track, or any other space within which a performance takes place.

Figure 2:
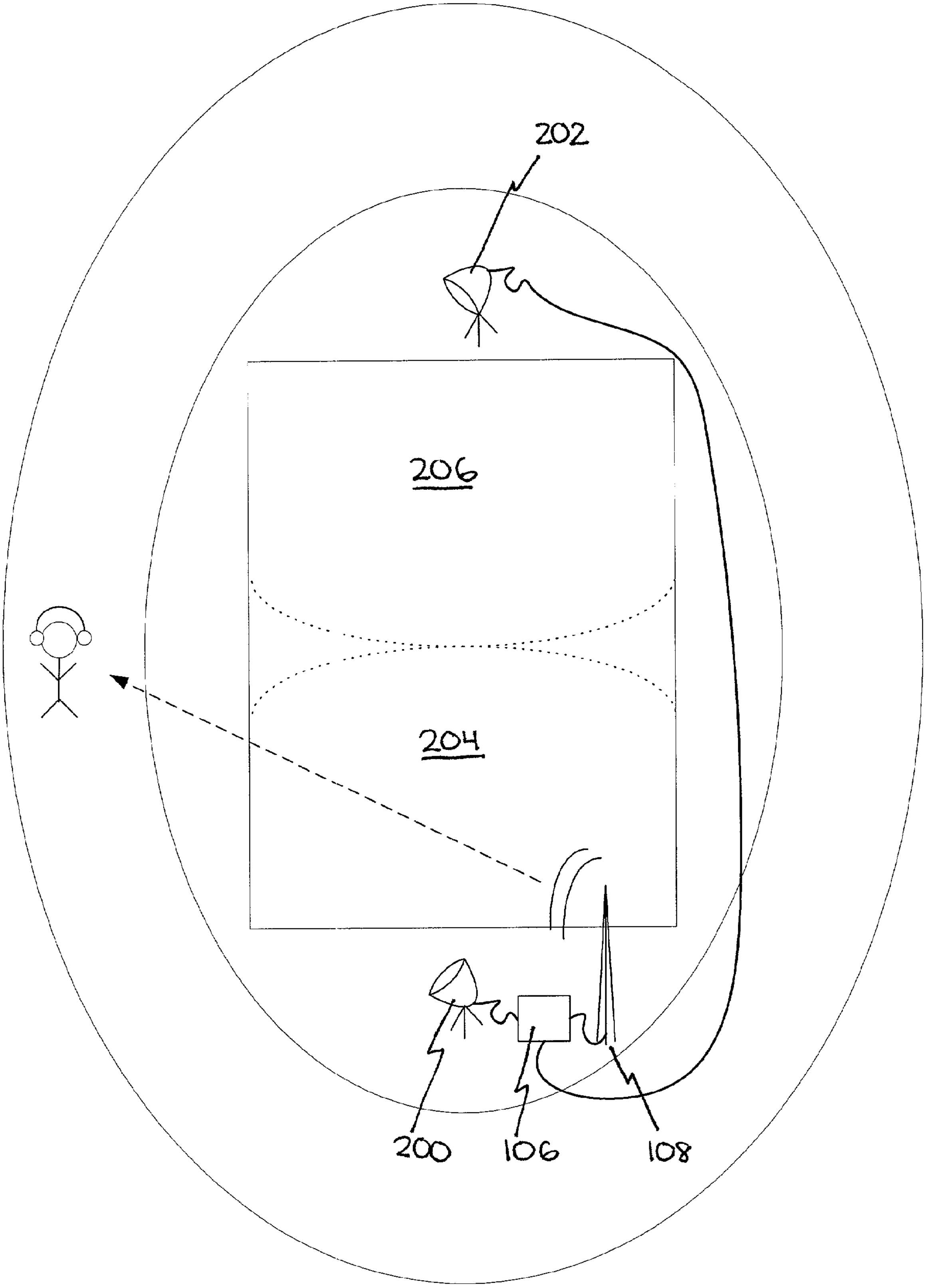
FIG. 2 depicts a system and method for collecting sound generated at more than one location within a defined space and transmitting it to another location within that defined space.

FIG. 2 illustrates the principle that sound may be collected from many points on or about the field. In FIG. 2, the audio collection unit is shown as being comprised of two parabolic microphones 200, 202. The field 100 of play is shown as being divided into two regions 204, 206. Region 204 is primarily recorded using parabolic microphone 200. Similarly, region 206 is primarily recorded using parabolic microphone 202. Parabolic microphones 200, 202 are connected on their output end either directly or indirectly to signal conditioning unit 106 which receives the signals, potentially mixing, filtering and switching the signals, and then outputs a conditioned signal to transmitter 108. The signal transmitted to fan 110 may thus be produced by switching and mixing between various microphones 200, 202.

For example, rather than moving the audio collection unit along the field as the point of interest changed, as might happen when a football team moves up and down a field, multiple microphones 200, 202 may be situated along the football field. As the ball is moved up or down the football field, a producer may, using the signal conditioning unit 106, raise the signal level of a microphone that collects sound from a region of the field upon which the ball is located. Microphones located near a region of the field more remote form the ball may be progressively mixed down or switched off altogether. Additionally, a sideline conversation of particular interest may be mixed up, mixed down or turned off altogether. Thus, in keeping with the principle just discussed, it follows that although the field 100 is shown as being divided into two regions 204, 206 recorded by two parabolic microphones 200, 202, the field 100 may actually be divided into as many regions as is necessary to conveniently record the game. It is understood that each region will be recorded by its own microphone.

Although FIG. 2 shows each microphone 200, 202 as being physically connected via a cable to signal conditioning unit 106, it is understood that this connection may be indirect and accomplished via transmission.

One anticipated method for the use of the system depicted in FIGS. 1 and 2 involves the sale of receiver 112 to one or more fans 110 in attendance at a particular event within the stadium. Since this profit model is reliant upon fan 110 purchasing a receiver 112 for each event that fan 110 attends, it is important that a receiver 112 sold to a fan 110 for a particular event not be functional during a following event. FIG. 3 illustrates a system and method designed with this constraint in mind.

Figure 3A:
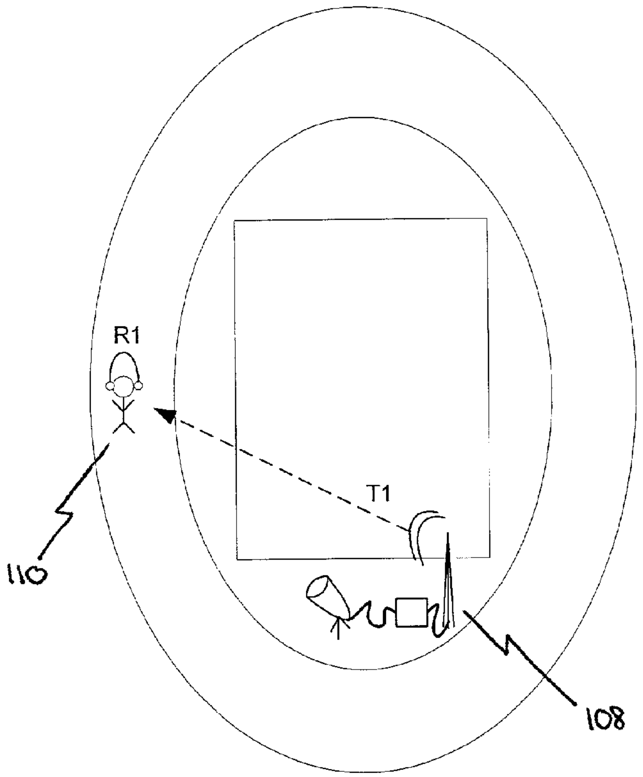
FIG. 3 depicts a system and method for the use of particular transmission protocols on an event-by-event basis.
Figure 3B:
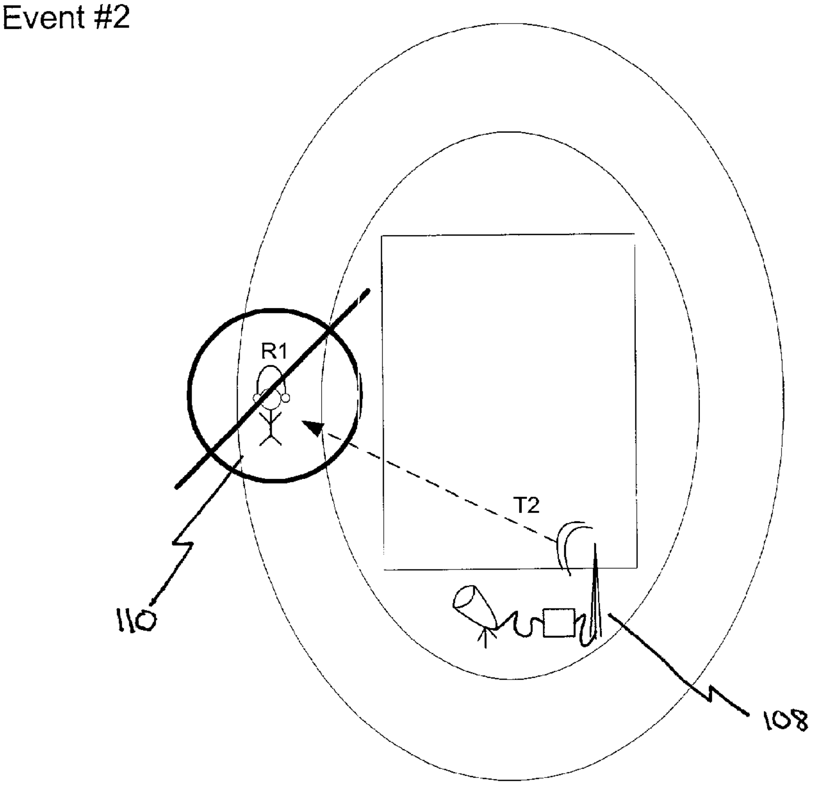

As can be seen from FIG. 3A, during a first event, transmitter 108 transmits its collected signal via a first transmission protocol uniquely associated with the first event. The fan 110 in attendance at the first event is wearing a receiver designed to operate and receive transmissions made in accordance with the first transmission protocol. During a second event, depicted in FIG. 3B, however, transmitter 108 will be transmitting under a second transmission protocol, so that if a fan 110 in attendance at the second event tries to use a receiver from the first event, that fan 110 will be unable to receive the transmission that is being broadcasted. The inoperability of the receiver purchased at the first event stems from the fact that that receiver was designed to receive transmissions made in accordance with the first transmission protocol, but the broadcast at the second event is made in accordance with a second transmission protocol. Therefore if a fan 110 wishes to receive the service of having sounds collected on or about the playing field transmitted to him, he must purchase a receiver at the second event, and may not receive the transmission using a receiver purchased at the first event.

Figure 4A:
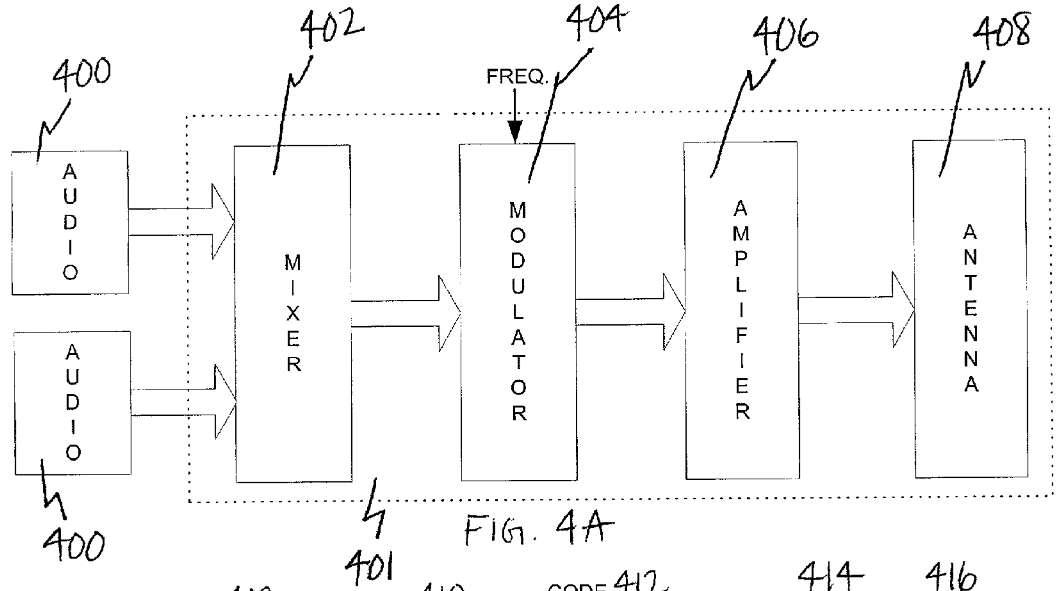
FIGS. 4A–4C depict various embodiments of transmitters in accordance with the present invention.
Figure 4B:
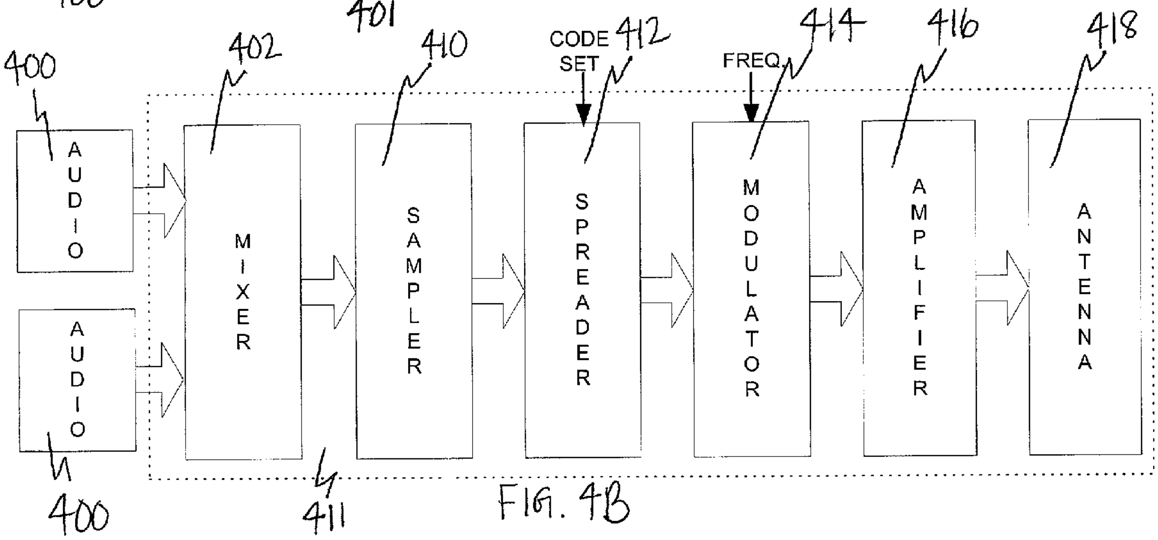
Figure 4C:
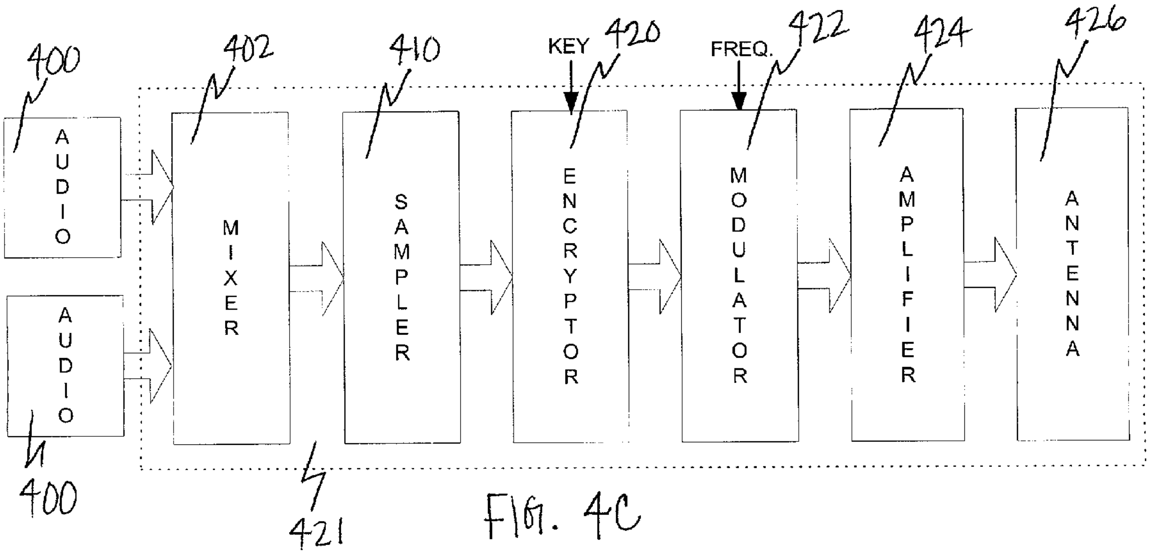

FIGS. 4A–4C depict three transmitters 401, 411, 421 capable of transmission under varying transmission protocols. One skilled in the art would understand that the transmitters depicted in FIGS. 4A, 4B and 4C are exemplary only and that many other such transmitters could serve the purpose of transmitting using differing transmission protocols from event to event.

Turning to FIG. 4A, therein is depicted a transmitter 401 which alters its transmission protocol by simply carrying its signal on a different carrier frequency from game to game. The transmitter 401 of FIG. 4A is shown as receiving two audio sources 400. In principle, the transmitter 401 of FIG. 4A could receive any number of audio sources, including only one audio source. The audio sources 400 are supplied to a mixer 402. The mixer 402 adjusts the relative signal strength of each audio source 400 received by it. The mixer 402 may also have switching ability, allowing the mixer 402 to completely turn off a particular audio source 400. Mixer 402 may also contain filters designed to eliminate signal components and frequency ranges that are undesired. Mixer 402 may also be embodied in an electrical component separate from transmitter 401. For example, one skilled in the art would understand that mixer 402 may be embodied within signal conditioning unit 106. Modulator 404 is coupled to the output of mixer 402 and receives the mixed signal, using that mixed signal to modulate a carrier signal. The frequency of the carrier signal to be modulated is a selectable value. The output of modulator 404 may be filtered to eliminate signal components in frequency ranges that are undesired. The output of modulator 404 is then fed to amplifier 406. Amplifier 406 is designed to receive a signal from modulator 404 and amplify it by a certain gain factor, such that when the output of amplifier 406 is fed to antenna 408, the resultant transmission will be strong enough to reach about the defined space such as a football arena, but not significantly further.

By selecting a different frequency to be employed by modulator 404 from event to event, a fan 110 can be discouraged from trying to bring a receiver 112 purchased at one event to a subsequent event. For example, consider a situation in which the transmitter of FIG. 4A is used at a football arena that houses ten home games a year. If at the first home game a first frequency is used as a carrier signal, a fan 110 wishing to receive the transmission would be required to have a receiver designed to receive a signal carried by at that frequency. If at the second home game the frequency used as a carrier signal by modulator 404 is selected to be a second frequency (different from the first frequency), then a receiver 112 purchased by a fan 110 at the first home game would not be useful to receive the signal transmitted at the second home game. Therefore, fan 110 would be obliged to purchase another receiver 112 at the second game if he wished to receive the transmitted sounds from the playing field. Thus, by changing the frequency at which the transmission will be carried from game to game or from event to event, a fan can be discouraged from only purchasing a single receiver, rather than purchasing a receiver at each event.

FIG. 4B depicts a transmitter 411 employing digital transmission and direct sequence spread spectrum technology. This type of transmitter may be useful for at least the following reason. It is possible that, if the transmitter 411 of FIG. 4A were employed using simple amplitude modulation or frequency modulation, a fan could receive the transmitted signal by bringing a scanner to the game, thereby receiving the broadcast service for free. To minimize that risk, the modulator 404 shown in FIG. 4A could use a modulation technique not ordinarily employed by scanners, such as phase modulation. However, even that would have certain drawbacks. The spectral space in which the transmitter of FIG. 4A is likely to be permitted to transmit in by the FCC is likely to be limited. Therefore, there will only be a limited number of carrier frequencies from which to choose. It follows, then, that at some point over a certain number of games, carrier frequencies may have to be reused, in which case a fan could use a receiver he had purchased from a previous game to receive the broadcast. However, the transmitter 411 depicted in FIG. 4B uses both carrier frequency and spreading code set as variables which can be altered to determine the transmission protocol. Therefore, a greater number of transmission protocols can be employed by using the transmitter depicted in FIG. 4B.

Like the transmitter 401 of FIG. 4A, the transmitter 411 of FIG. 4B is able to receive multiple audio signals 400. Also like the transmitter of FIG. 4A, the transmitter of FIG. 4B employs a mixer 402 that is capable of adjusting the relative signal strength of the multiple audio signals received by its input stage. Mixer 402 also may also employ switches enabling the mixer to completely turn off certain audio sources. The output of mixer 402 may contain a filter to eliminate signal content and frequency ranges that are undesired. Mixer 402 may also be embodied in an electrical component separate from transmitter 411. Sampler 410 is connected to the output stage of mixer 402 for the purpose of periodically sampling and thereby digitizing the output of the mixer 402. Sampler 410 delivers its digitized signal to spreader 412. Spreader 412 receives a signal that has been sampled at a certain number of samples per second and using a set of codes, breaks each sample into a larger string of ones and zeros known as "chips." Because the signal when expressed with chips contains more chips per second than bits per second, the Nyquist frequency of the chipped signal is greater than the Nyquist frequency of the sampled signal and therefore has a wider spectrum. As will be shown in FIG. 5B, a receiver employing direct sequence spread spectrum technology must employ the same codes as the transmitter in order to receive the signal. The signal from the spreader 412 is then fed to modulator 414, which like the transmitter of FIG. 4A, uses a selectable frequency to set the frequency of the carrier signal that is being modulated against the output from the spreader 412. The signal generated by modulator 414 is then fed to amplifier 416, which amplifies the signal to a signal strength sufficient to broadcast the signal via antenna 418 throughout the enclosed space such as a football field without extending significantly further.

The transmission protocol employed by the transmitter 421 of FIG. 4C is defined by the frequency of the carrier signal selected by the modulator and the key used by an encrypter container within the transmitter. Like the transmitter of FIG. 4B, the transmitter 421 illustrated in FIG. 4C can receive multiple audio signals on its input. Also like the transmitter of FIG. 4B, the transmitter 421 of FIG. 4C contains a mixer 402 at its front end. The mixer 402 has the ability to adjust the relative signal strength of its multiple audio inputs. Mixer 402 may also have switching ability so as to be able to turn on and off a particular audio source or sources. The output stage of mixer 402 may have a filter designed to attenuate signal components in frequency ranges that are undesired. Mixer 402 may also be embodied in an electrical component separate from transmitter 421. The output stage of mixer 402 is fed to a sampler 410 that samples the mixed signal at a particular rate, thereby producing a digitized signal. The digitized signal is then fed to an encrypter 420. The operation of encrypter 420 is determined by the encryption key that it employs. The encryption key is programmable so that it may be changed from use to use and therefore from event to event. The output of encrypter 420 is an encrypted digital signal that is fed to modulator 422, which modulates a carrier signal of a selectable frequency. The output of modulator 422 is delivered to amplifier 424, which amplifies the signal to a certain signal strength sufficient to reach throughout the defined space, such as a football stadium, when transmitted by antenna 426.

Like the transmitter of FIG. 4B, the transmitter 421 of FIG. 4C is able to employ relatively more transmission protocols in a finite spectral space because its transmission protocol is defined by frequency and one other variable, in this case an encryption key. As will be seen in the discussion related to the receiver revealed in FIG. 5C, a receiver intended to operate with this transmitter must use the same encryption key or a matched decryption key in order to properly receive the transmitted signal.

The transmitters 401, 411, 421 depicted in FIGS. 4A–4C may be fixed or may be mobile and are presented as examples of transmitters that may be suitable for such an application. One skilled in the art would understand that many such transmitters would be suitable for this application.

Figure 5A:
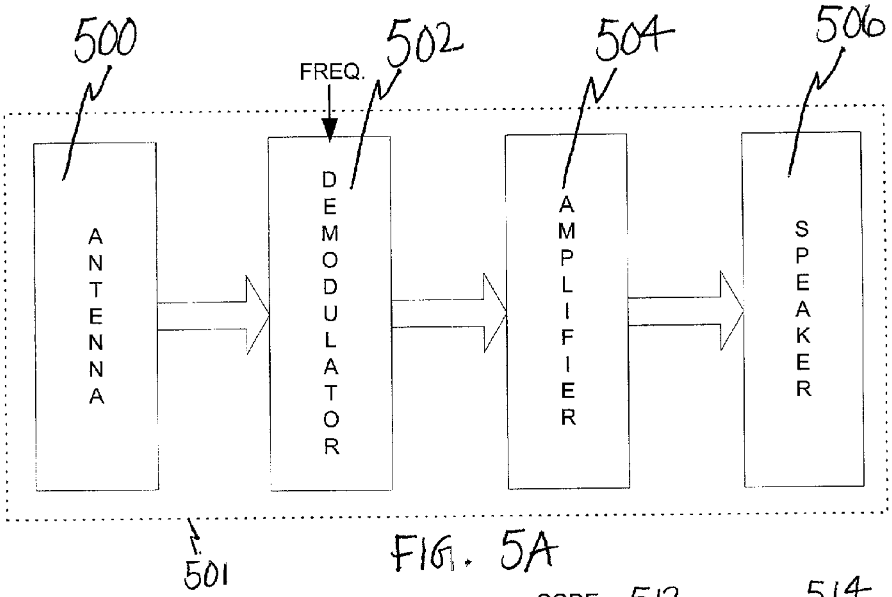
FIGS. 5A–5C depict various embodiments of receivers in accordance with the present invention.
Figure 5B:
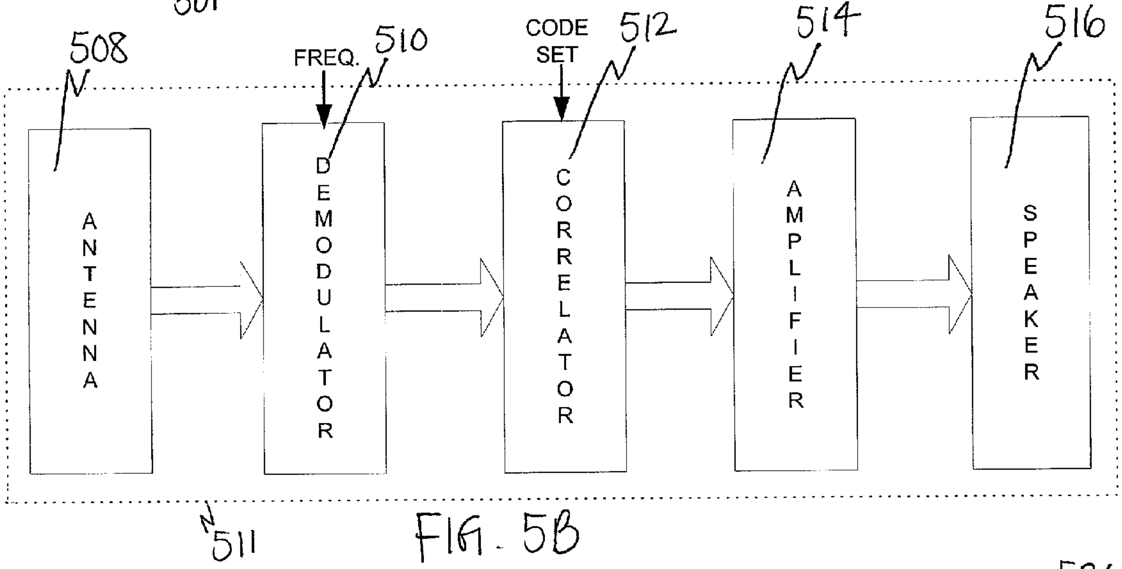
Figure 5C:
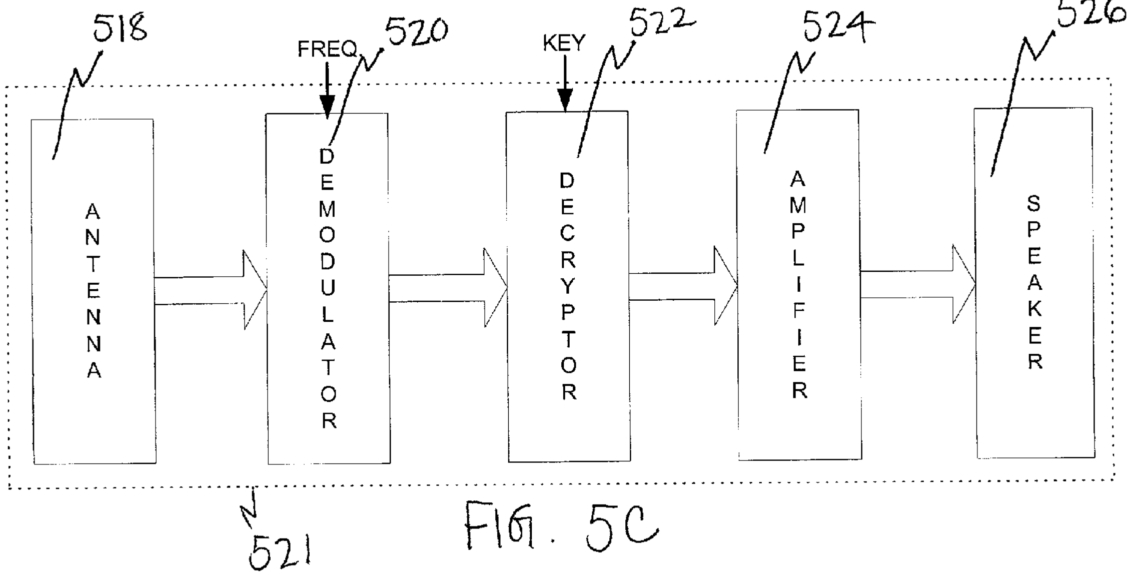

FIGS. 5A–5C depict receivers 501, 511, 521 suitable for embodying the method and apparatus depicted in FIGS. 1–3. FIG. 5A depicts a receiver 501 suitable for receiving a signal transmitted by the transmitter 401 of FIG. 4A. FIG. 5B depicts a receiver 511 suitable for receiving a signal transmitted by the transmitter 411 of FIG. 4B. FIG. 5C depicts a receiver 521 suitable for receiving a signal transmitted by the transmitter 421 of FIG. 4C.

The receiver 501 of FIG. 5A has an antenna of appropriate geometry to receive a signal transmitted at the particular carrier frequency used by the transmitter of FIG. 4A. The output of antenna 500 therefore contains the modulated carrier signal that was output from amplifier 406. Demodulator 502 has its input stage coupled to antenna 500, thereby receiving the aforementioned carrier signal. Demodulator 502 takes the modulated carrier signal and restores it to its baseband form. The output of demodulator 502 may contain a filter or set of filters intended to remove signal components of undesired frequency ranges. The operation of demodulator 502 can be controlled by selecting the frequency it uses to demodulate the received signal, thereby allowing the receiver 501 to operate under a transmission protocol suitable for receiving the transmission of the transmitter depicted in FIG. 4A. At its input stage, amplifier 504 receives a signal emanating from the demodulator 502. Amplifier 504 amplifies the signal to a suitable signal strength so that the user of this receiver is able to hear the signal coming out of speaker 506.

The receiver 501 depicted in FIG. 5A may be disposable or may be recyclable. The receiver of FIG. 5A may also be optionally fashioned in the form of an earpiece or personal speaker of some form to permit only one user at a time to listen to the signal produced by speaker 506. In fashioning the receiver 501 of FIG. 5A in this manner, each member of a party will be forced to purchase the receiver of FIG. 5A in order to enjoy its associated service.

The receiver 511 of FIG. 5B has an antenna 508 of suitable geometry to receive the signal transmitted by the transmitter of FIG. 4B. Therefore, the output of antenna 508 contains the modulated carrier signal delivered by amplifier 416. Demodulator 510 is coupled at its input stage to the antenna 508. Demodulator 510 takes the signal encoded on the carrier signal and restores it to its baseband form. The operation of demodulator 510 is determinable by selecting the frequency used to demodulate its input. The output of demodulator 510 may contain one or more filters designed to eliminate signal components having undesirable frequency ranges. The output of demodulator 510 is therefore a sequence of chips, otherwise known as a "spread spectrum signal," and is fed to correlator 512. Correlator 512 correlates the spread spectrum signal provided by demodulator 510 against a set of spreading codes, thereby yielding the original unspread signal. The operation of correlator 512 is determined by the code set against which the correlation is performed, and may therefore be selectable by programming the code set. The output stage of correlator 512 may include digital-to-analog converter to restore the digital signal to an analog form, and may also include one or more filters to remove signal components having frequency ranges that are undesirable. Amplifier 514 receives the signal emanating from correlator 512. Amplifier 514 amplifies the signal strength of its input so that the user of the receiver depicted in FIG. 5B is able to hear the signal when it is played by speaker 516.

The receiver 511 depicted in FIG. 5B, like the receiver 501 depicted in FIG. 5A, may be fashioned in the form of an earpiece or some form of personal listening device so as to permit use by only one fan or person at a time. Also like the receiver 501 of FIG. 5A, the receiver 511 of FIG. 5B may be disposable or may be recyclable.

The receiver 521 of FIG. 5C has an antenna 518, the geometry of which is designed to permit the antenna 518 to receive the signal transmitted by the transmitter of FIG. 4C. Accordingly, the output of antenna 518 contains the modulated carrier signal delivered by amplifier 424. Demodulator 520 receives at its input stage the signal from the antenna 518 and, like demodulators 502 and 510, demodulator 520 has a selectable frequency to permit demodulation of signals centered about various carrier frequencies. Demodulator 520 may have a filter or set of filters on its output stage to attenuate signal components having undesirable frequency ranges. The output of demodulator 520 is fed to decrypter 522. The operation of decrypter 522 is controlled by a selectable key. The key used in conjunction with decrypter 522 should be the same key used by encrypter 420, or should be a matched key. The output stage of decrypter 522 may have a digital-to-analog converter to restore the decrypted digital signal to its original analog form. The output stage of decrypter 522 may also have one or more filters designed to eliminate signal components in unwanted frequency ranges. The input stage of amplifier 524 receives the signal delivered from decrypter 522. Amplifier 524 operates to amplify its output to a signal strength, such that the user of the receiver depicted in FIG. 5C will be able to hear the audio signal when the output of amplifier 524 is played through speaker 526.

The receiver 521 of FIG. 5C, like the receivers 501, 511 of FIGS. 5B and 5A, may be fashioned as an earpiece or any form of personal listening device for the same reasons as stated above. The receiver 521 of FIG. 5C may also be either deposable or recyclable.

The receivers 501, 511, 521 depicted in FIGS. 5A–5C may be fashioned to be operable for a set of events, such as an entire season of sports events. For example, rather than being conifgured for usage during a single event (such as a football game), the receivers of FIGS. 5A–5C receiver may be configured to use a particular protocol for an entire season. Alternatively, the receivers 501, 511, 521 of FIGS. 5A–5C may be configured to permit use of a range of pre-scheduled protocols identified for use during a season of events (such as an NFL season). For example, if it were determined that a particular professional football team would use ten protocols during ten home games, the receivers 501, 511, 521 of FIGS. 5A–5C may be conifgured to selectably operate under those ten protocols. Thus, a fan would be enabled to purchase a single receiver and yet receive the service for an entire season.

Figure 6:
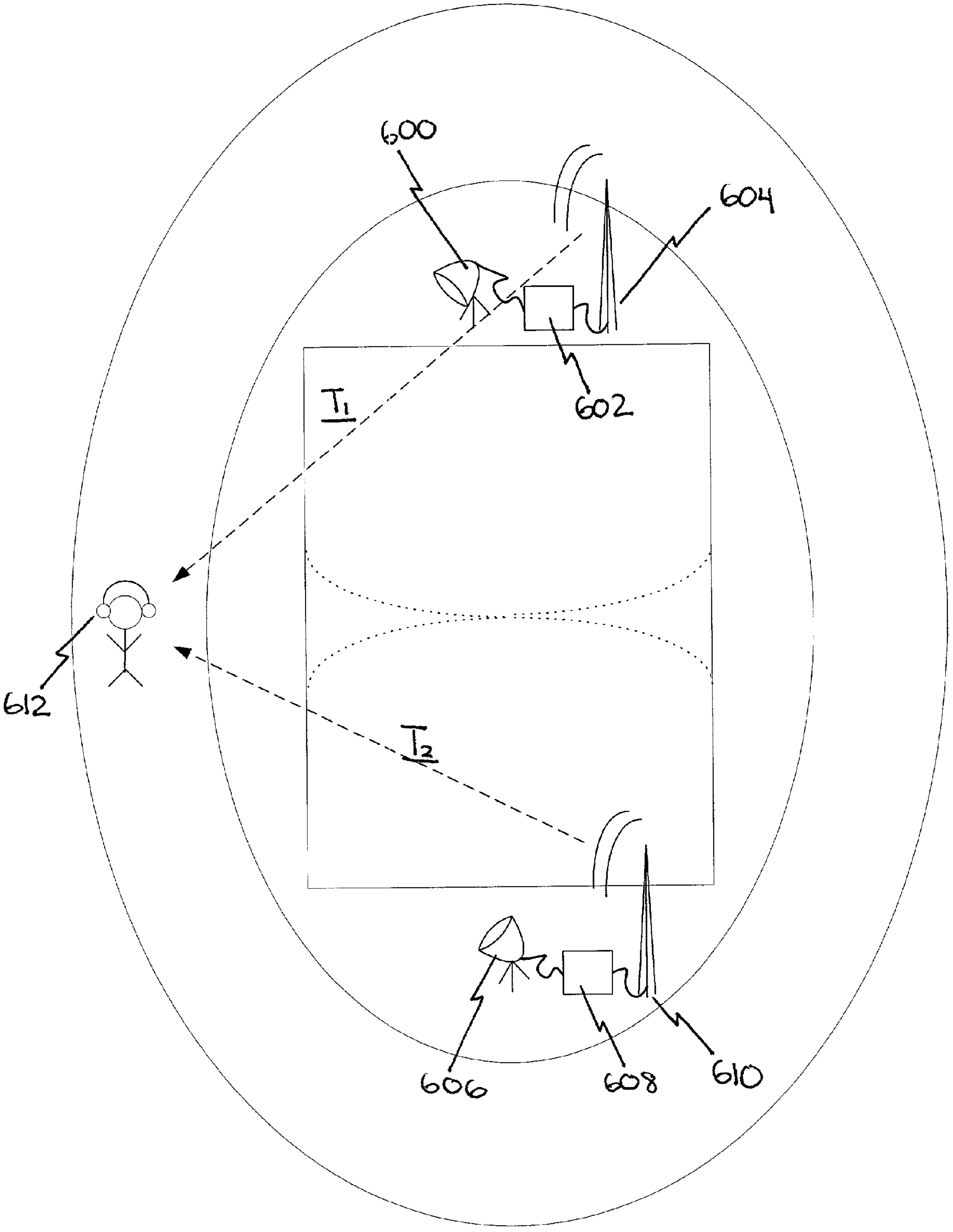
FIG. 6 depicts a system and method for the use of multiple transmission protocols to enable a microphone-by-microphone selection.

FIG. 6 illustrates the principle that the sound collected by various audio collection units can be transmitted simultaneously during the same event, yet transmitted under different transmission protocols, thus allowing a recipient of the service to choose among the various audio collection units for reception. As can be seen from FIG. 6, audio collection unit 600 receives sound from one region of the playing field, while audio collection unit 606 receives sound from another region of the playing field. Although FIG. 6 shows the various audio collection units collecting sound from various regions of the field, it is possible that audio collection units could be used to collect sound from, for example, a home sideline and a visiting sideline, an offensive huddle and a defensive huddle, or a home dugout and a visiting dugout.

As shown in FIG. 6, each audio collection unit 600, 606 is connected to its own signal conditioning unit 602, 608 and transmission unit 604, 610. As can also be seen, each transmission unit 604, 610 operates under its own transmission protocol. A fan using the service wears receiver 612, and can choose to tune into one transmitter or the other. This fan's choice could be aided by the distribution of a menu that allows the fan to know which transmission protocol correlates with which audio collection unit. For example, upon entry of a stadium, a fan could be passed a menu revealing that transmission protocol #1 will allow him to listen to an offensive huddle, transmission protocol #2 to a defensive huddle, protocol # 3 to a visiting sideline, transmission protocol #4 to a home sideline, and transmission protocol #5 to the region of the field where the ball is, and so on.

Although FIG. 6 shows each audio collection unit 600, 606 being connected to its own signal conditioning unit 602, 608 and its own transmission unit 604, 610, each audio collection unit 600, 606 could be connected to a single central signal conditioning unit which could be connected to a single transmission unit which would transmit each signal collected by each audio collection unit using different transmission protocols.

The system and method of FIG. 6 could be implemented using the transmitter and receivers shown in FIGS. 4A–4C and FIGS. 5A–5C so that the transmission protocol could be defined based upon either purely frequency, or a combination of frequency and spreading code set or a combination of frequency and encryption key. A user of the service would then wear the receiver 612 and select either simply the frequency that he wished to tune in or the frequency in combination with the spreading code set or the frequency in combination with the decryption key.

The systems and methods shown in FIGS. 1–6 share some common properties. For example, the transmission shown by the method and system of FIGS. 1–6 is contemporaneous with the event from which the sound is being collected so that minimal delay is introduced between the collection of the signal and the transmission of the signal. In other words, a fan receiving the transmission and watching the game would notice little delay between the events witnessed and the sound transmitted to him. Another property shared in common by the systems and methods in FIGS. 1–6 is the absence of two-way communication. In other words, the user of the service has no ability to communicate with the transmission unit. Another characteristic shared in common by the systems and methods of FIGS. 1–6 is that the sound being transmitted is the result purely of the sound being collected from on or about the playing field or area of interest, and does not include a narrative of the event, as would be found in a conventional radio or television broadcast. Stated otherwise, the sound being transmitted is, in large part, the saoud being collected from the audio collection units, with few additions. It is contemplated, however, that advertising could be transmitted between plays, for instance, or that other insignificant sound could be mixed with and transmitted with the sound collected from the field.

Figure 7:
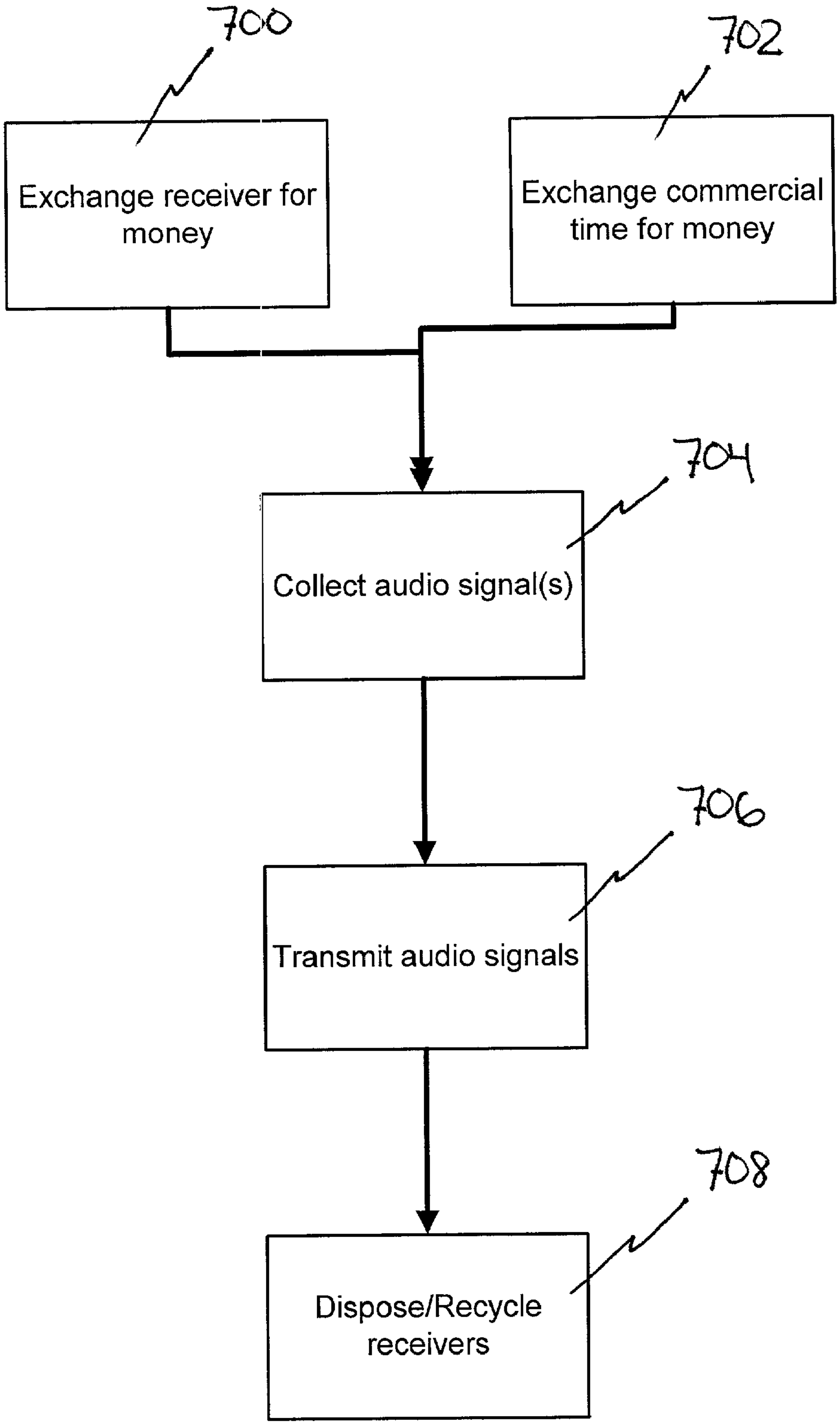
FIG. 7 depicts one business method in accordance with the present invention.

FIG. 7 illustrates one particular business method by which the systems and methods described in FIGS. 1–6 could be employed. As can be seen in FIG. 7, at least two profit models could be employed. In operation 700, a profit model is employed whereby each fan purchases a receiver, if that fan desires to be a recipient of the broadcast service. In operation 702, a profit model is shown wherein commercial time is sold to those who would wish to purchase advertising. Commercial transmission may take place at various intervals during an event such as between plays, during scheduled commercial breaks, between quarters and during halftime, between periods or innings, etc. Operations 700 and 702 could be employed conjunctively, meaning that one could both sell the receivers and sell commercial time. Operations 700 and 702 could also be employed disjunctively, meaning that one could either sell the receivers or sell commercial time, without doing both. Operation 704, which follows either the conjunctive or disjunctive performance of operations 700 and 702, requires that the audio signal of the particular event be collected and subsequently transmitted to receivers located within the space defined by the arena, stadium, theater, etc. in operation 706. Operation 708, which is performed at the termination of the service, shows that the receivers may either be disposed of or recycled. If a recycling model is used, fans could return the receivers in exchange for the return of a deposit and receivers could be reprogrammed at a later time with a different set of transmission protocols.

From the foregoing detailed description and examples, it will be evident that modifications and variations can be made in the devices and methods of the invention without departing from the spirit or scope of the invention. Therefore, it is intended that all modifications and verifications not departing from the spirit of the invention come within the scope of the claims and their equivalents.

The invention claimed is:

1. A method of delivering sound to a plurality of individuals within a fixed space, the method comprising the steps of:

assigning a transmission protocol to an event occurring within the fixed space, wherein said transmission protocol is not used for subsequent events occurring within said fixed space;

collecting an audio signal generated at a first location within the fixed space;

transmitting, under said transmission protocol, said audio signal collected from said first location to an earpiece each worn by at least one of said plurality of individuals within said fixed space; and receiving said audio signal with said earpiece, wherein said earpiece is configured to operate under said first transmission protocol and collecting an audio signal generated at a second location within said fixed space;

transmitting, under a second transmission protocol, said audio signal collected from said second location to said earpiece worn by said at least one of said plurality of individuals within said fixed space and at a distance from said first location; and, wherein the step of receiving said audio signal with said earpiece comprises receiving said audio signal with said earpiece, wherein said earpiece is configured to selectably operate under said first transmission protocol or said second transmission protocol, thereby permitting an operator of said ear piece to select one of said first or second location within said fixed space that operator would like to listen to.

2. A method of conducting business by deriving revenue from distributing sound to a plurality of individuals within a fixed space, the method comprising the steps of:

assigning a transmission protocol to an event occurring within the fixed space, wherein said transmission protocol is not used for subsequent events occurring within said fixed space;

collecting an audio signal generated at a first location within the fixed space;

transmitting, under said transmission protocol, said audio signal to an earpiece each worn by at least one of said plurality of individuals within said fixed space; and collecting an audio signal generated at a second location within a fixed space; and transmitting, under a second transmission protocol, said audio signal collected from said second location to said earpiece worn by said at least one of said plurality of individuals within said fixed space.

3. The method of claim 2 wherein deriving revenue from distribution of said earpiece comprises the exchange of money for said earpiece.

4. The method of claim 2 wherein deriving revenue from distribution of said earpiece comprises selling advertising time scheduled during intervals of transmission.

* * * * *